United States Patent [19]
Thomas

[11] 4,300,933
[45] Nov. 17, 1981

[54] METHOD OF MANUFACTURING AUTOMOTIVE WINDOWS BY COATING A SCORED SUBSTRATE

[75] Inventor: Donald D. Thomas, Crestline, Ohio
[73] Assignee: PPG Industries, Inc., Pittsburgh, Pa.
[21] Appl. No.: 153,282
[22] Filed: May 27, 1980
[51] Int. Cl.³ .................. C03B 27/00; C03B 33/02; C03C 17/22
[52] U.S. Cl. .................. 65/60.1; 65/61; 65/106; 65/112; 65/114; 83/880; 427/272; 427/275; 427/282; 427/284; 427/287; 427/292
[58] Field of Search .......... 65/60 R, 61, 106, 112, 65/114; 427/272, 282, 284, 287, 292, 275; 83/880

[56] References Cited
U.S. PATENT DOCUMENTS

| | | | |
|---|---|---|---|
| 3,638,564 | 2/1972 | Prange et al. | 101/126 X |
| 3,865,293 | 2/1975 | Ernsberger et al. | 225/2 |
| 3,865,673 | 2/1975 | De Torre | 65/113 X |
| 3,900,641 | 8/1975 | Woodman et al. | 427/282 |
| 4,119,426 | 10/1978 | Kelly | 65/114 X |
| 4,140,820 | 2/1979 | De Torre | 427/292 |

Primary Examiner—Richard V. Fisher
Attorney, Agent, or Firm—Donald Carl Lepiane

[57] ABSTRACT

An automotive back window for flush glazing is manufactured by subsurface scoring a glass sheet to define an automotive back window blank in the sheet surrounded by sheet supporting glass portions. An endless band of ceramic paste is silk screened over the score as screen portions beyond the screen pattern are supported by the supporting glass portions. The sheet is thereafter baked to remove volatiles in the paste, the supporting glass portions removed from the blank and the blank having the baked pattern is bent and/or tempered.

10 Claims, 7 Drawing Figures

METHOD OF MANUFACTURING AUTOMOTIVE WINDOWS BY COATING A SCORED SUBSTRATE

BACKGROUND OF THE INVENTION

1. Field of the Invention:

This invention relates to a method of manufacturing automotive windows.

2. Discussion of the Technical Problems and Present Technology:

Automotive body weight and wind resistance are being reduced to improve fuel efficiency. One technique is to eliminate metal trim around the automotive windows or lites by flush glazing. In flush glazing the lite is secured in a recess by an adhesive. To prevent degradation of the adhesive as a result of exposure to the sun's rays an opaque endless band of a ceramic paste is fused around the edge of the lite. The band preferably extends out to the edge of the lite; has a width sufficient to shade the underlying adhesive; has a width sufficiently narrow to provide maximum vision; and is abrasive resistant to withstand cleaning and the elements. These requirements can be achieved by silk screening a band of the ceramic paste on an automotive window blank and thereafter firing the paste. In order to assure shading of the underlying adhesive and extending the pattern to the edge of the blank, the silk screen pattern extends beyond the cut edge of the blank. This technique, although otherwise acceptable, reduces the useable life of the screen because the screen bends over the cut edge of the glass blank during the silk screening process.

In U.S. Pat. No. 4,140,820 there is taught a technique for protecting the edge of a glass sheet during coating by scoring a piece of glass to define a sheet within the piece. As the sheet advances along a conveyor through a coating station, the trim around the sheet protects the edges of the sheet against damage. The teachings of the above-mentioned patent provides a technique suitable for protecting the edges of a glass sheet advancing along a conveyor through a coating station. It would also be advantageous to provide a technique for increasing the useable life of a silk screen used in the manufacture of automotive windows for flush glazing.

SUMMARY OF THE INVENTION

This invention relates to a method of manufacturing a sheet of refractory material, e.g. an automotive glass window having a predetermined configuration and an endless band of ceramic or enamel paste on the marginal edge portions of one surface and extending the ceramic paste out to the edge of the window at that surface. The method includes the step of scoring a piece of glass within its edges to define an automotive window blank having supporting glass surfaces around its edge. Thereafter a band of the ceramic paste is silk screened on the marginal edge portions of the sheet and extends to the edges of the automotive blank defined by the score. During the silk screening operation the supporting glass around the blank supports the silk screen to prevent damage thereto. After the silk screening operation, the ceramic paste may be baked to remove volatiles therein afterwhich the supporting glass is removed from the automotive blank. Normally, the edges of the blank are acceptable for the following tempering and/or bending operations, however, if needed the cut edges may be edged.

DESCRIPTION OF THE INVENTION

Figure 1:
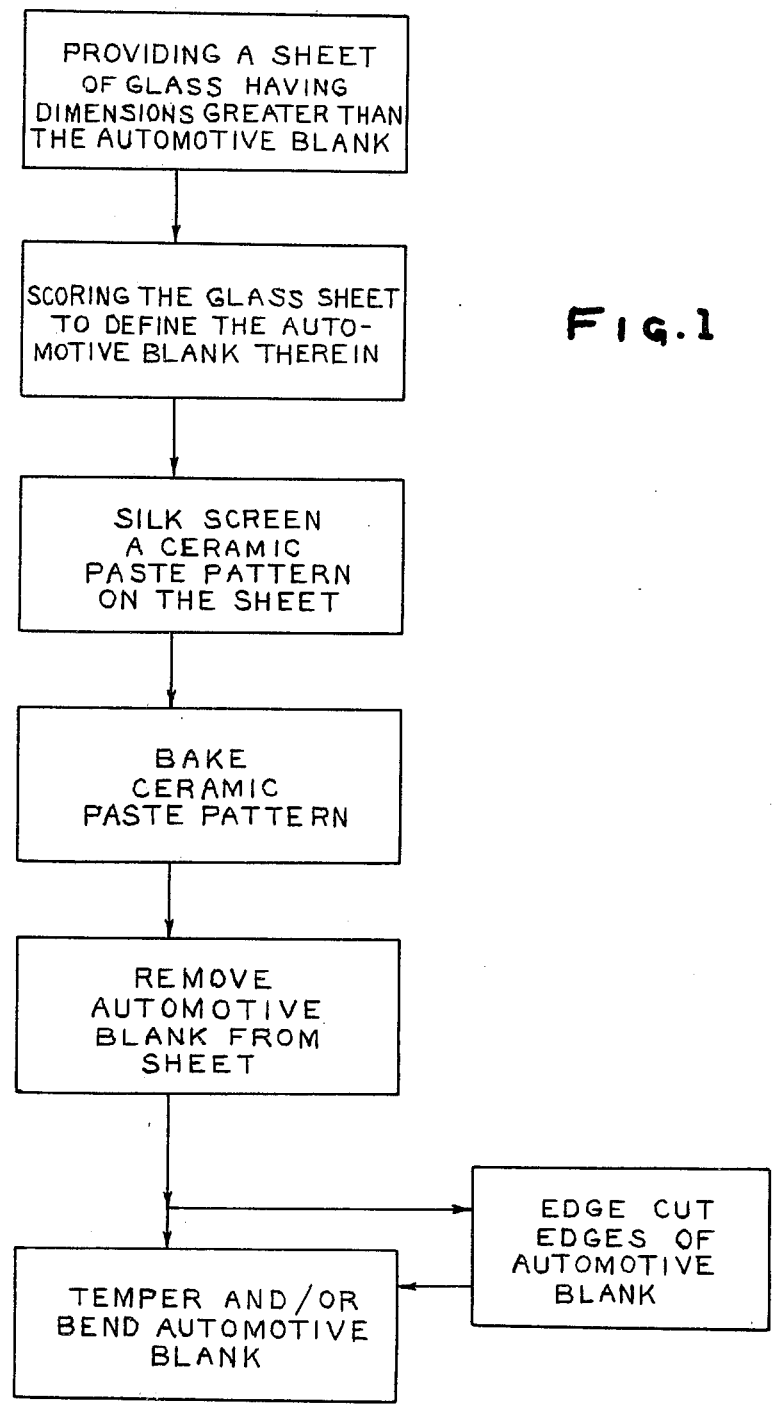
FIG. 1 is a flow diagram illustrating steps incorporating features of the invention for manufacturing an automotive window or lite.

The flow chart shown in FIG. 1 illustrates process steps incorporating features of the invention for the production of automotive windows or lites, e.g. back windows. As will be appreciated, the invention is not limited to the manufacture of automotive back windows which is presented to illustrate one environment in which the invention may be practiced. A glass sheet or substrate 10 (see FIG. 2) having side or peripheral dimensions larger than corresponding side or peripheral dimensions of the automotive window 12 (see FIG. 3) is conveniently scored within its edges to define automotive window blank 14 therein surrounded by supporting surface portions 16. In the practice of the invention it is recommended that score 18 imposed in the sheet 10 be a non-healing score. In other words, after the passageway of time, the supporting surface portions can be removed from the automotive window blank without rescoring the sheet.

Types of scores that do not heal but not limited thereto are, (1) a pseudosubsurface score as taught in U.S. Pat. No. 3,865,673 and (2) a subsurface score or crack as taught in U.S. Pat. Nos. 3,865,293 and 4,007,834. As taught in U.S. Pat. No. 3,865,673, both pseudosubsurface and subsurface scores are free of wing and/or spall. A subsurface score is preferred for scoring the glass because (1) the score does not heal, (2) the cut edges normally do not require edging and (3) there is little, if any, surface damage. Providing a score that does not heal with the passage of time, the glass portions 16 can be removed at a later time, e.g. up to about 3 months. The cut edge needs little if any edging because a subsurface score has little if any edge damage associated therewith. Eliminating surface damage removes the presence of glass chips that may damage the silk screen.

Figure 4:
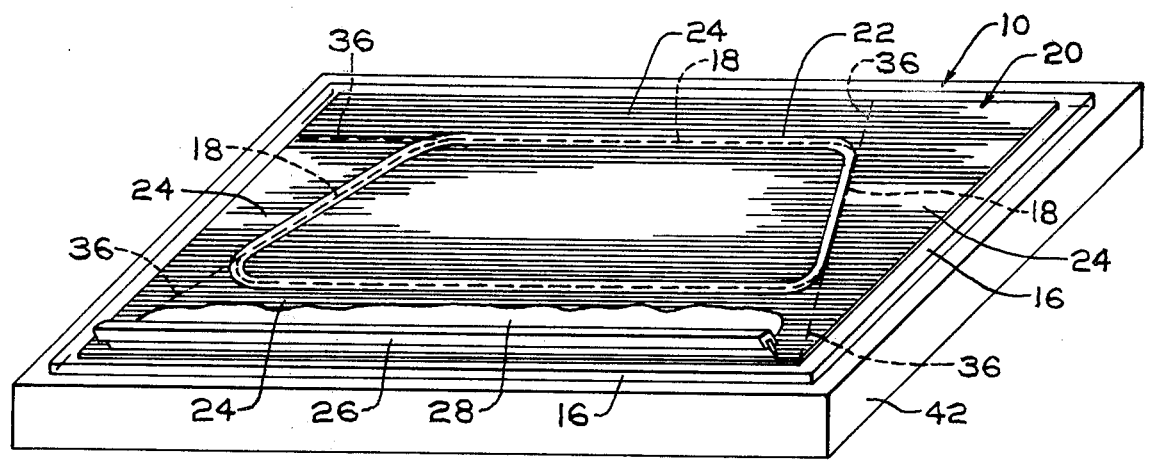
FIG. 4 is an isometric view illustrating silk screening a pattern on the scored glass sheet of FIG. 2 in accordance with the teachings of the invention.
Figure 5:
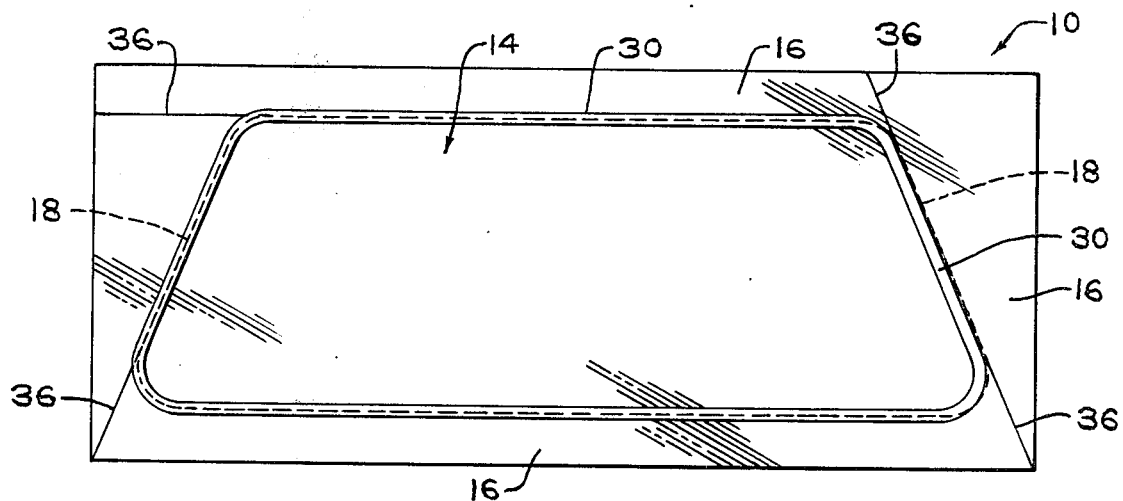
FIG. 5 is a front elevation view of the glass piece having the automotive blank defined therein by a ceramic pattern and a score in accordance with the teachings of the invention.

After the score 18 outlining the blank 14 has been imposed in the sheet 10, a silk screen 20 having a pattern 22 e.g. an endless band overlying or out to the score 18 is positioned over the sheet as shown in FIG. 4. Silk screen portions 24 beyond the pattern 22 are supported by supporting surface portions 16. During the silk screening operation, squeegee 26 spreads paste 28 over the screen 20 and through the pattern 22 to provide the glass sheet 10 with the blank 14 outlined by an endless band pattern 30 overlying or out to the score 18 as shown in FIG. 5. Supporting the screen portions 24 extending beyond the screen pattern 22 by the supporting sheet surface portions 16 prevents bending of the screen over cut glass edges and increase the useable life of the screen.

Figure 6:
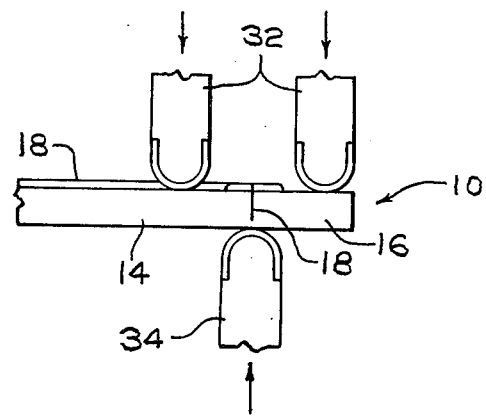
FIG. 6 is a side elevation view showing the application of bending moments to remove the supporting glass from the sheet of glass.

As shown in FIG. 1, after the silk screening the sheet is heated or baked to slowly remove volatiles in the paste. If the paste has no volatiles, the baking step although useful is not necessary; and thereforeis not limiting to the invention. After the sheet having the pattern is baked, the supporting glass surface portions are removed from the automotive blank in any convenient manner. For example, first forces 32 as shown in FIG. 6 are applied about the score 18 as an opposing second force 34 is applied to the opposite surface of the score. Although not limiting to the invention, relief scores 36 shown in FIG. 5 extending from the edge of the sheet to the score 18 are used to facilitate removal of the sheet portions 16.

Figure 7:
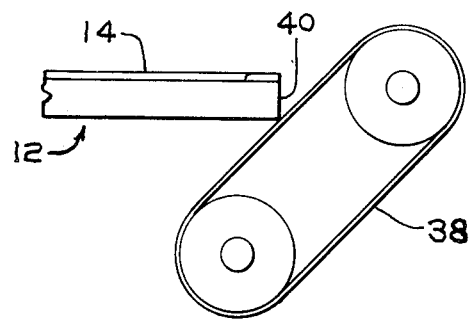
FIG. 7 is a side elevated view illustrating edging of a cut edge of the automotive blank.

The blank 14 having the baked pattern 30 may be conveniently bent and/or tempered, e.g. as taught in U.S. Pat. No. 4,119,426. The teachings of U.S. Pat. No. 4,119,426 are hereby incorporated by reference. The window blank 14 may be tempered without edging the cut edges because a subsurface score produces cut edges essentially free of damage. Further, it has been found that more cut edge damage can be tolerated during tempering when the automotive blank has an opaque coating at the edge. It is theorized tha the opaque coating concentrates and retains heat in the marginal edge portions of the glass which results in slow cooling of the glass edges to eliminate fracture generation at the edge during rapid cooling of the heated sheet. However, if the cut edge is edged it may be accomplished in any convenient manner. For example, as shown in FIG. 7 a hand held belt edger 38 may be used to remove edge damage at the cut edges 40.

As can now be appreciated, the invention is not limited to the manufacture of automotive windows that are tempered but may be practiced on automotive windows that are laminated, e.g. automotive windshields. Further, the removal of the supporting portions 18 may be performed before or after the baking of the pattern to remove the volatiles therein. Still further, the baking step may be performed during bending of the blank which is performed at lower temperatures than tempering.

DETAILED DESCRIPTION OF THE INVENTION

Figure 2:
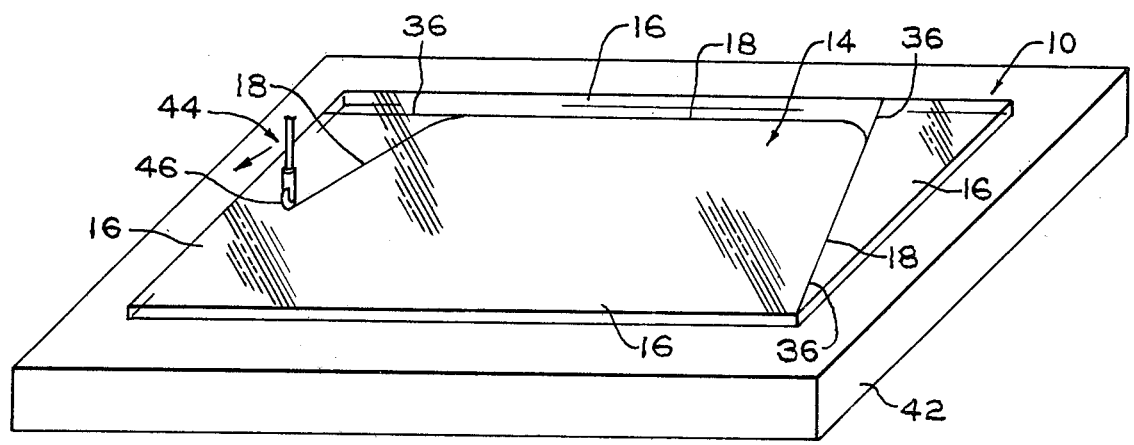
FIG. 2 is an isometric view showing the scoring in accordance with the teachings of the invention of glass piece to define an automotive window blank therein.
Figure 3:
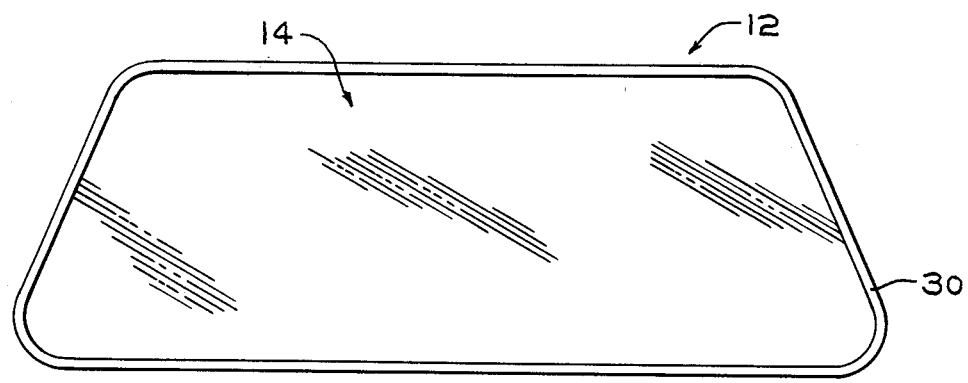
FIG. 3 is a front elevation view of an automotive window made from the window blank in accordance with the teachings of the invention.

With reference to FIG. 1, a glass sheet 10 having a thickness of about 3/16 inch (0.48 centimeters), a length of about 3 feet (0.9 meters) and a width of about 5 feet (1.5 meters) is mounted on a table 42 as shown in FIG. 2 and a trapezoidal automotive back window blank 14 is outlined in the sheet 10 by subsurface score 18. The blank 14 has a base length of about 4 feet (1.2 meters) with the opposite side having a length of about 3 feet (0.9 meters). The sides each have a length of about 1½ feet (0.45 meters). The score is imposed by scoring apparatus 44 including a wheel 46 of the type taught in U.S. Pat. No. 4,007,834. The wheel 46 has a major radius of about ¾ inch (1.92 centimeters), a radiused scoring surface of about 0.010 inch (0.25 millimeters) and is urged under a scoring load of about 423 pounds (146.6 kilograms).

After the score 18 is imposed in the sheet a silk screen 30 having an endless band pattern 22 is positioned over the sheet 10. The pattern 22 is sized to overlay or extend out to or adjacent the score 18. A ceramic paste 28 of the type sold by Drakenfield Co. of Washington, Pennsylvania as 24-1169 mat black is spread over the screen by a squeegee 26 to force the paste through the pattern 22 to provide a pattern 30 on the sheet 10 as shown in FIG. 5. During the silk screening, screen portions 24 outside of the screen pattern 22 are supported by sheet supporting surface portions 16. After silk screening the sheet 10 having the pattern 30 is conveniently baked at a temperature of about 400° F. (243° C.) to drive out the volatiles e.g. pine oil in the ceramic paste. After baking, opposing bending moment forces 32 and 34 are applied as shown in FIG. 6 to remove the supporting surface portions 16 from the automotive blank 14. Thereafter the edges 40 of the automotive blank are conveniently edged e.g. by belt edger 38, as shown in FIG. 7. The automotive blank is then tempered. During tempering the ceramic paste pattern 30 fuses to the glass to provide the automotive back window 12 for flush glazing.

As can be appreciated the above example is not limiting to the invention and is presented to illustrate the practice of the invention in the manufacture of an automotive back window. For example, the automotive blank may be outlined by a score of the type taught in U.S. Pat. No. 3,756,487 which teachings are hereby incorporated by reference. Further, in the discussion the terms "automotive window blank" and "automotive window" were used for clarity of discussion and therefore the automotive window may be the automotive window blank and vice versa.

What is claimed:

1. A method of making an automotive window for flush glazing, comprising the steps of:
    scoring a sheet within its edges to define an automotive window blank having supporting sheet portions beyond the periphery of said window blank;
    silk screening a pattern on the sheet;
    supporting screen portions adjacent and beyond the pattern by the supporting sheet portions while practicing said silk screening step; and
    removing the supporting sheet portions from the automotive window blank.

2. The method as set forth in claim 1 wherein the pattern is an endless ceramic paste adjacent peripheral edge portions of the window blank.

3. The method as set forth in claim 2 wherein the ceramic paste has volatiles therein and further including a step of:
    heating the sheet to remove the volatiles in the paste before practicing said removal step.

4. The method as set forth in claim 2 wherein the ceramic paste has volatiles therein and further including a step of:
    heating the window blank to remove the volatiles in the paste after practicing said removal step.

5. The method as set forth in claim 1 wherein said scoring step imposes a score that is essentially free of wing and/or spall.

6. The method as set forth in claim 1, 2, 3, 4 or 5, after the silk screening step, further including the step of tempering the automotive blank to provide the automotive window.

7. The method as set forth in claim 1, 2, 3, 4 or 5, after the silk screen step further including the step of bending the automotive window blank to provide an automotive window.

8. The method as set forth in claim 6 further including the step of:

edging the cut edge of the window blank before practicing said tempering step.

9. The method as set forth in claim 7 further including the step of:

edging the cut edge of the blank before practicing said bending step.

10. The method as set forth in claim 2 wherein the score outlines the automotive blank in the sheet and the endless band pattern overlays the score.

* * * * *